BEST AVAILABLE COPY

DESIGN.

J. BEISWANGER.

UTILITY TRAY.

APPLICATION FILED DEC. 3, 1920.

Reissued Mar. 8, 1921.

15,055.

Inventor

John Beiswanger

By Edwin H. Hamilton

Attorney

BEST AVAILABLE COPY

UNITED STATES PATENT OFFICE.

JOHN BEISWANGER, OF STEUBENVILLE, OHIO, ASSIGNOR TO GILL BROTHERS COMPANY, OF STEUBENVILLE, OHIO, A CORPORATION OF WEST VIRGINIA.

DESIGN FOR A UTILITY-TRAY.

15,055. Specification for Reissued Design. Reissued Mar. 8, 1921.

Original No. 56,335, dated October 5, 1920, Serial No. 334,858, filed October 31, 1919, for 7 years. Application for reissue filed December 3, 1920. Serial No. 428,178. Term of patent 14 years.

*To all whom it may concern:*

Be it known that I, JOHN BEISWANGER, a citizen of the United States of America, and resident of Steubenville, county of Jefferson, State of Ohio, have invented a certain new, original, and ornamental Design for a Utility-Tray, of which the following is a specification.

In the accompanying drawing I have illustrated a utility tray, constructed in accordance with my invention, the same being of resistive transparent glass.

Figure 1:
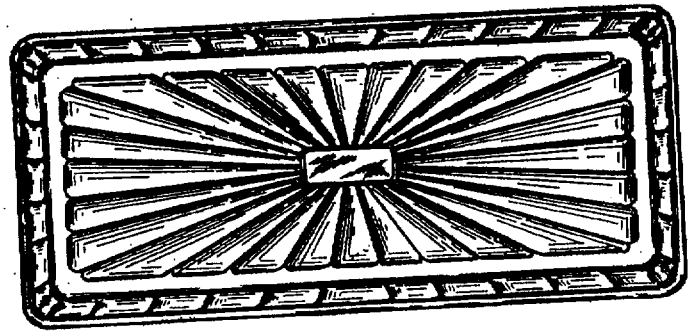

In the drawing, Figure 1 is a bottom plan view of a utility tray showing my invention.

Figure 2:
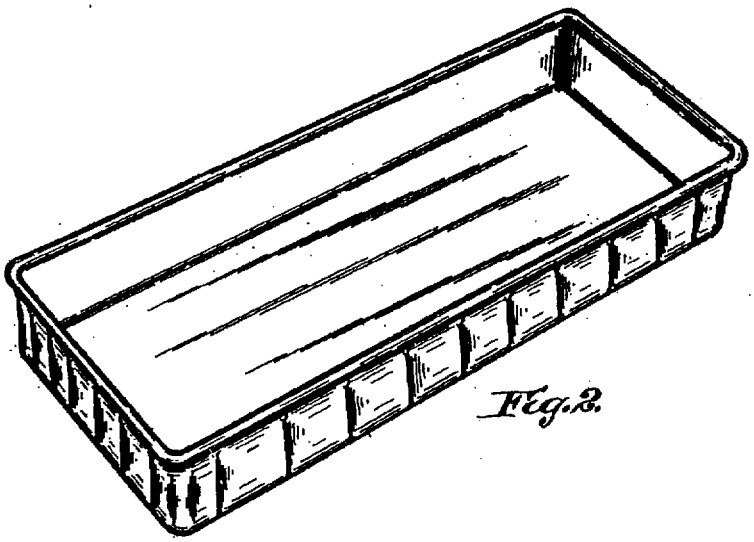

Fig. 2 is a perspective view looking into the dish.

Having thus described and illustrated my invention, I claim:

The ornamental design for a utility tray substantially as shown and described.

Signed by me at Steubenville, Jefferson county, Ohio, this 24th day of November, 1920.

JOHN BEISWANGER.

Witnesses:
M. S. BRAND,
W. R. PATTERSON.